(12) United States Patent
Su et al.

(10) Patent No.: US 9,805,635 B2
(45) Date of Patent: Oct. 31, 2017

(54) DISPLAY DRIVING METHOD, APPARATUS AND DISPLAY SYSTEM

(71) Applicants: BOE TECHNOLOGY GROUP CO., LTD., Beijing (CN); BEIJING BOE DISPLAY TECHNOLOGY CO., LTD., Beijing (CN)

(72) Inventors: Wengang Su, Beijing (CN); Weihao Hu, Beijing (CN); Chunbing Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/171,358

(22) Filed: Jun. 2, 2016

(65) Prior Publication Data
US 2016/0360149 A1    Dec. 8, 2016

(30) Foreign Application Priority Data

Jun. 4, 2015 (CN) .......................... 2015 1 0303433

(51) Int. Cl.
*H04N 9/74* (2006.01)
*G09G 3/00* (2006.01)
(Continued)

(52) U.S. Cl.
CPC ............. *G09G 3/003* (2013.01); *G02B 27/26* (2013.01); *H04N 13/0434* (2013.01); *H04N 2013/0463* (2013.01)

(58) Field of Classification Search
USPC ....... 348/588, 706, 714, 719, 752, 762, 767, 348/428.1, 333.11, 308, 246, 58, 57, 49,
(Continued)

(56) References Cited

U.S. PATENT DOCUMENTS

2005/0286125 A1* 12/2005 Sundstrom ........... G02B 27/225
                                                              359/462
2006/0125917 A1*  6/2006 Cha .................... H04N 13/0278
                                                              348/51
(Continued)

FOREIGN PATENT DOCUMENTS

CN         101046944 A    10/2007
CN          10180073 A     9/2010
(Continued)

OTHER PUBLICATIONS

First Chinese Office Action dated Dec. 2, 2016; Appln. No. 201510303433.9.

*Primary Examiner* — Jefferey F Harold
*Assistant Examiner* — Mustafizur Rahman
(74) *Attorney, Agent, or Firm* — Ladas & Parry LLP

(57) ABSTRACT

Embodiments of the present disclosure provide a display driving method, an apparatus and a display system, and are used for displaying different video signals to different users simultaneously through one display device. The method comprises: receiving a first image signal and a second image signal which correspond to different users respectively; performing a signal process on the first image signal to acquire a processed first image signal, and performing a signal process on the second image signal to acquire a processed second image signal; driving pixels of odd-numbered columns in the pixel array to display the processed first image signal and driving pixels of even-numbered columns in the pixel array to display the processed second image signal, wherein a polarization direction of the emergent light of the pixels of odd-numbered columns is different from that of the emergent light of the pixels of even-numbered columns.

18 Claims, 2 Drawing Sheets

(51) Int. Cl.
*H04N 13/04* (2006.01)
*G02B 27/26* (2006.01)

(58) Field of Classification Search
USPC ...... 348/46; 345/6, 204, 207, 419, 652, 690;
349/1, 9, 37, 80, 87, 96, 99, 146; 356/33,
356/322, 327, 453, 487, 491, 364;
359/204.3, 207.9, 246, 251, 281, 301,
359/303, 304, 464, 465
See application file for complete search history.

(56) References Cited

U.S. PATENT DOCUMENTS

| | | | |
|---|---|---|---|
| 2007/0176914 A1* | 8/2007 | Bae | H04N 13/0497 345/204 |
| 2010/0007582 A1* | 1/2010 | Zalewski | A63F 13/00 345/8 |
| 2010/0060983 A1* | 3/2010 | Wu | H04N 13/0413 359/466 |
| 2010/0201790 A1* | 8/2010 | Son | G02B 27/2264 348/53 |
| 2010/0225735 A1* | 9/2010 | Shaffer | G06F 3/012 348/14.08 |
| 2012/0062551 A1* | 3/2012 | Lee | H04N 13/0018 345/419 |
| 2012/0162389 A1* | 6/2012 | Seo | G03B 35/04 348/49 |
| 2012/0162580 A1* | 6/2012 | Wu | G02F 1/133512 349/96 |
| 2012/0169688 A1* | 7/2012 | Chen | H04N 13/0404 345/209 |
| 2012/0287080 A1* | 11/2012 | Akimoto | G02B 26/023 345/174 |
| 2013/0169757 A1* | 7/2013 | Saito | H04N 13/0232 348/46 |
| 2014/0293113 A1* | 10/2014 | Niemi | H04N 5/23293 348/333.11 |
| 2015/0221263 A1* | 8/2015 | Koh | H04N 13/0497 345/691 |
| 2016/0065914 A1* | 3/2016 | Choi | H01L 27/14621 348/280 |

FOREIGN PATENT DOCUMENTS

| | | |
|---|---|---|
| CN | 101944352 A | 1/2011 |
| CN | 102118592 A | 7/2011 |
| CN | 102831875 A | 12/2012 |

* cited by examiner

DISPLAY DRIVING METHOD, APPARATUS AND DISPLAY SYSTEM

TECHNICAL FIELD OF THE DISCLOSURE

The present disclosure relates to a display driving method, an apparatus and a display system.

BACKGROUND

A display has been widely used in various electronic devices such as a mobile phone, a PDA (Personal Digital Assistant), a digital camera, a computer screen or a notebook computer screen. Diversified displays gradually become one of the important characteristics of all kinds of electronic devices.

With an increasing of living standards and continuous developments of the display technology, functions of a display apparatus are more and more, and user's requirements for the display apparatus are higher and higher too. Currently, a display apparatus generally can only correspond to one user, or to multiple users watching a same video image, therefore the multiple users can only watch the same video image while using a same display apparatus, such that a requirements for watching different video images by the multiple users can not be satisfied simultaneously. For example, there is only one TV set in the family but family members want to watch their respective favorite TV programs by the TV set. However, since the TV set can display only one of the TV programs, remaining family members can not watch their favorite TV programs, which influences the user experience of the display apparatus.

SUMMARY

Embodiments of the present disclosure provide a display driving method, an apparatus and a display system for displaying different video signals to different users simultaneously by one display apparatus.

In order to achieve the above object, the embodiments of the present disclosure employ technical schemes as follows.

In a first aspect, there is provided a display driving method for driving a display device to display, the display device comprising a pixel array formed by pixels of M rows and N columns, the method comprising:

receiving a first image signal and a second image signal which correspond to different users respectively;

performing a signal process on the first image signal to acquire a processed first image signal, and performing a signal process on the second image signal to acquire a processed second image signal;

driving the pixels of odd-numbered columns in the pixel array to display the processed first image signal and driving the pixels of even-numbered columns in the pixel array to display the processed second image signal, wherein emergent light of the pixels of odd-numbered columns is a first polarized light, emergent light of the pixels of even-numbered columns is a second polarized light, and a polarization direction of the first polarized light is different from that of the second polarized light.

Alternatively, the first image signal is a 2D (Two Dimensional) image signal or a 3D (Three Dimensional) image signal, and the second image signal is a 2D image signal or a 3D image signal.

Alternatively, when the first image signal is the 3D image signal, said performing the signal process on the first image signal to acquire the processed first image signal comprises:

extracting a first left-eye view signal and a first right-eye view signal from the first image signal, and said driving the pixels of odd-numbered columns in the pixel array to display the processed first image signal comprises:

driving the pixels of odd-numbered columns in the pixel array to display the first left-eye view signal and the first right-eye view signal alternately.

Alternatively, when the second image signal is the 3D image signal, said performing the signal process on the second image signal to acquire the processed second image signal comprises:

extracting a second left-eye view signal and a second right-eye view signal from the second image signal, and said driving the pixels of even-numbered columns in the pixel array to display the processed second image signal comprises:

driving the pixels of even-numbered columns in the pixel array to display the second left-eye view signal and the second right-eye view signal alternately.

Alternatively, an alternating frequency at which the first left-eye view signal and the first right-eye view signal are alternately displayed is greater than or equal to 120 HZ, and an alternating frequency at which the second left-eye view signal and the second right-eye view signal are alternately displayed is greater than or equal to 120 HZ.

In a second aspect, there is provided a display driving apparatus for driving a display device to display, the display device comprising a pixel array formed by pixels of M rows and N columns, the display driving apparatus comprising:

a reception unit operable to receive a first image signal and a second image signal which correspond to different users respectively;

a first processing unit operable to perform a signal process on the first image signal to acquire a processed first image signal;

a second processing unit operable to perform a signal process on the second image signal to acquire a processed second image signal;

a first driving unit operable to drive the pixels of odd-numbered columns in the pixel array to display the processed first image signal; and a second driving unit operable to drive the pixels of even-numbered columns in the pixel array to display the processed second image signal, wherein emergent light of the pixels of odd-numbered columns is a first polarized light, emergent light of the pixels of even-numbered columns is a second polarized light, and a polarization direction of the first polarized light is different from that of the second polarized light.

Alternatively, the first image signal is a 2D image signal or a 3D image signal, and the second image signal is a 2D image signal or a 3D image signal.

Alternatively, when the first image signal is the 3D image signal, said first processing unit is further operable to extract a first left-eye view signal and a first right-eye view signal from the first image signal; and said first driving unit is further operable to drive the pixels of odd-numbered columns in the pixel array to display the first left-eye view signal and the first right-eye view signal alternately.

Alternatively, when the second image signal is the 3D image signal, said second processing unit is further operable to extract a second left-eye view signal and a second right-eye view signal from the second image signal; and said second driving unit is further operable to drive the pixels of even-numbered columns in the pixel array to display the second left-eye view signal and the second right-eye view signal alternately.

Alternatively, an alternating frequency at which the first driving unit alternately displays the first left-eye view signal and the first right-eye view signal is greater than or equal to 120 HZ, and an alternating frequency at which the second driving unit alternately displays the second left-eye view signal and the second right-eye view signal is greater than or equal to 120 HZ.

In a third aspect, there is provided a display system comprising a display device and glasses, wherein the display device comprises any one of the display driving apparatus described in the second aspect, the glasses comprises odd-type glasses, even-type glasses, 3D odd-type glasses and 3D even-type glasses, wherein the odd-type glasses may transmit the first polarized light; the even-type glasses may transmit the second polarized light; the 3D odd-type glasses comprises a first left-eye lens and a first right-eye lens, the first left-eye lens and the first right-eye lens are both able to transmit the first polarized light, the first left-eye lens is in a transmission state when pixels of odd-numbered columns of the display device display the first left-eye view signal, and the first right-eye lens is in the transmission state when the pixels of odd-numbered columns of the display device display the first right-eye view signal; and the 3D even-type glasses comprises a second left-eye lens and a second right-eye lens, the second left-eye lens and the second right-eye lens are both able to transmit the second polarized light, the second left-eye lens is in the transmission state when the pixels of even-numbered columns of the display device display the second left-eye view signal, and the second right-eye lens is in the transmission state when the pixels of even-numbered columns of the display device display the second right-eye view signal.

The display driving method, the apparatus and the display system provided by the embodiments of the present disclosure firstly receives the first image signal and the second image signal, then processes the first image signal and the second image signal respectively, and finally drives the pixels of odd-numbered columns in the pixel array to display the processed first image signal and drives the pixels of even-numbered columns in the pixel array to display the processed second image signal, and the emergent light of the pixels of odd-numbered columns is the first polarized light, the emergent light of the pixels of even-numbered columns is the second polarized light, and the polarization direction of the first polarized light is different from that of the second polarized light. Thereby, different users can select different polarized lenses to watch different image signals according to their own requirements. Thus, the embodiment of the present disclosure realizes that different video signals are displayed simultaneously to different users through one display device.

BRIEF DESCRIPTION OF THE DRAWINGS

In order to more clearly explain technical schemes in embodiments of the present disclosure, attached drawings to be used in the description of embodiments or the prior art will be introduced simply in the following. Apparently, the attached drawings described below are only some embodiments of the present disclosure. It is possible for the ordinary skill in the art to obtain other attached drawings according to these attached drawings on the premise of paying no creative work.

DETAILED DESCRIPTION

In the following, technical schemes in embodiments of the present disclosure will be described clearly and completely in conjunction with attached drawings in the embodiments of the present disclosure. Apparently, the embodiments to be described are only a part but not all of embodiments of the present disclosure. All of other embodiments obtained by the ordinary skill in the art based on the embodiments of the present disclosure on the premise of paying no creative work belong to the protection scope of the present disclosure.

It should be noted that the row and column in the embodiments of the present disclosure are relative definitions. In the description in the embodiments of the present disclosure, the explanation is made by taking the rows being in the horizontal direction and columns being in the vertical direction as an example. However, since the pixels are arranged in the form of matrix, when a observation direction differs, the rows and columns may be exchanged and the horizontal direction and the vertical direction may also be exchanged.

In addition, in order to clearly describe technical schemes of embodiments of the present disclosure, in the embodiments of the present disclosure, terms such as "first" and "second" are used to distinguish same items or similar items whose functions are substantially same from each other. It can be understand by those skilled in the art that terms such as "first" and "second" do not limit the quantity and the execution order.

Figure 1:
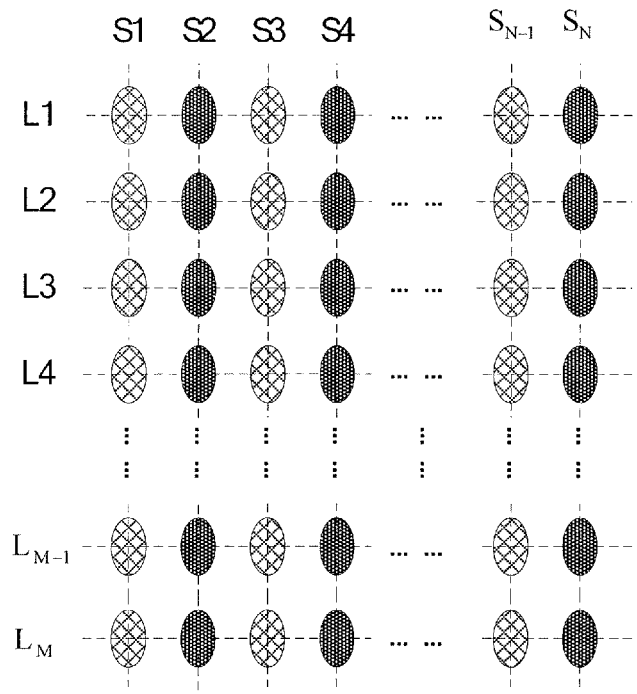
FIG. 1 is a schematic diagram of a structure of a pixel array provided by an embodiment of the present disclosure.

An embodiment of the present disclosure provides a display driving method for driving a display device to display. As shown in FIG. 1, the display device includes a pixel array formed by pixels of M rows (L1, L2, L3, L4 . . . $L_{M-1}$, $L_M$) and N columns (S1, S2, S3, S4 . . . $S_{N-1}$, $S_N$). The explanation is made taking the N being an even number as an example in the figure. Values of M and N may be determined according to an actual (physical) resolution of the display device. For example, if the resolution of the display device is 1600*900, then a value of M is 1600 and a value of N is 900.

Figure 2:
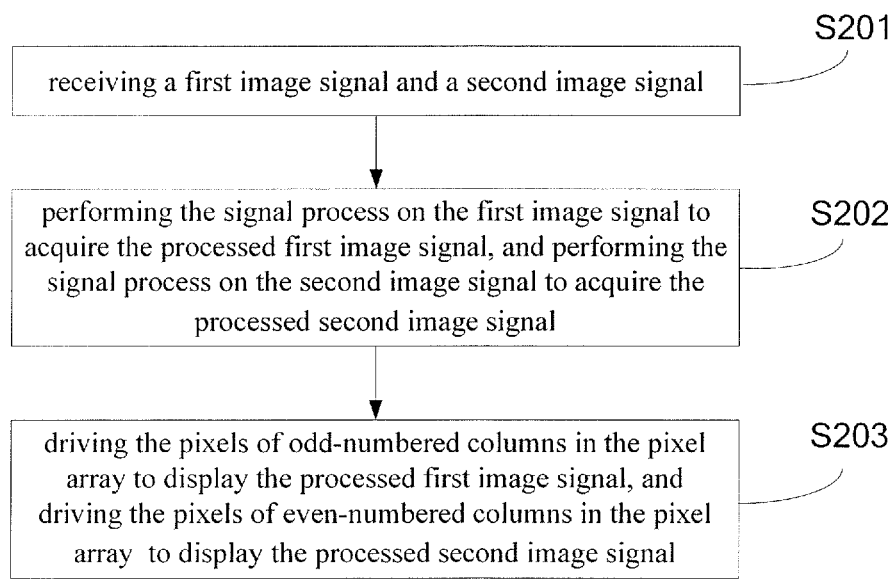
FIG. 2 is a flowchart of steps of a display driving method provided by an embodiment of the present disclosure.

Specifically, as shown in FIG. 2, the display driving method includes following steps.

At the step S201, a first image signal and a second image signal which correspond to different users respectively are received.

In an example, the first image signal and the second image signal may be different.

At the step S202, a signal process is performed on the first image signal to acquire a processed first image signal, and a signal process is performed on the second image signal to acquire a processed second image signal.

In an example, the signal process performed on the first image signal and the second image signal generally includes a decoding, an analog-to-digital conversion, a video enhancement processing, a color space conversion, an output signal formatting, etc. Also, the processing procedure of the signal process on the image signals is not limited thereto, as long as the processed image signals are able to be used as the image signals in step S203.

At the step S203, the pixels of odd-numbered columns in the pixel array are driven to display the processed first image signal and the pixels of even-numbered columns in the pixel array are driven to display the processed second image signal, wherein emergent light of the pixels of odd-numbered columns is a first polarized light, emergent light of the pixels of even-numbered columns is a second polarized light, and a polarization direction of the first polarized light is different from that of the second polarized light.

The display driving method provided by the embodiment of the present disclosure firstly receives the first image signal and the second image signal, then processes the first image signal and the second image signal respectively, and finally drives the pixels of odd-numbered columns in the pixel array to display the processed first image signal and drives the pixels of even-numbered columns in the pixel array to display the processed second image signal, and the emergent light of the pixels of odd-numbered columns is the first polarized light, the emergent light of the pixels of even-numbered columns is the second polarized light, and the polarization direction of the first polarized light is different from that of the second polarized light. Thereby, different users may select different polarized lenses to watch different image signals according to their own requirements. Thus, the embodiment of the present disclosure realizes that different video signals are displayed simultaneously to different users through one display device.

In an example, the first image signal is a 2D image signal or a 3D image signal, and the second image signal is a 2D image signal or a 3D image signal.

Specifically, signal sources for the first image signal and the second image signal are independent from each other, the first image signal is the 2D image signal or the 3D image signal, and the second image signal is the 2D image signal or the 3D image signal. The signal sources include Tuners, VGA (Video Graphics Array) interfaces, DVIs (Digital Video Interfaces), USBs (Universal Serial Buses), YPBPR interfaces, video composite interfaces, HDMIs (High Definition Multimedia Interfaces), etc. The corresponding first image signals and second image signals include video signals of the Tuner, VGA, DVI, USB, Ypbpr, Composite, HDMI, etc.

Figure 3:
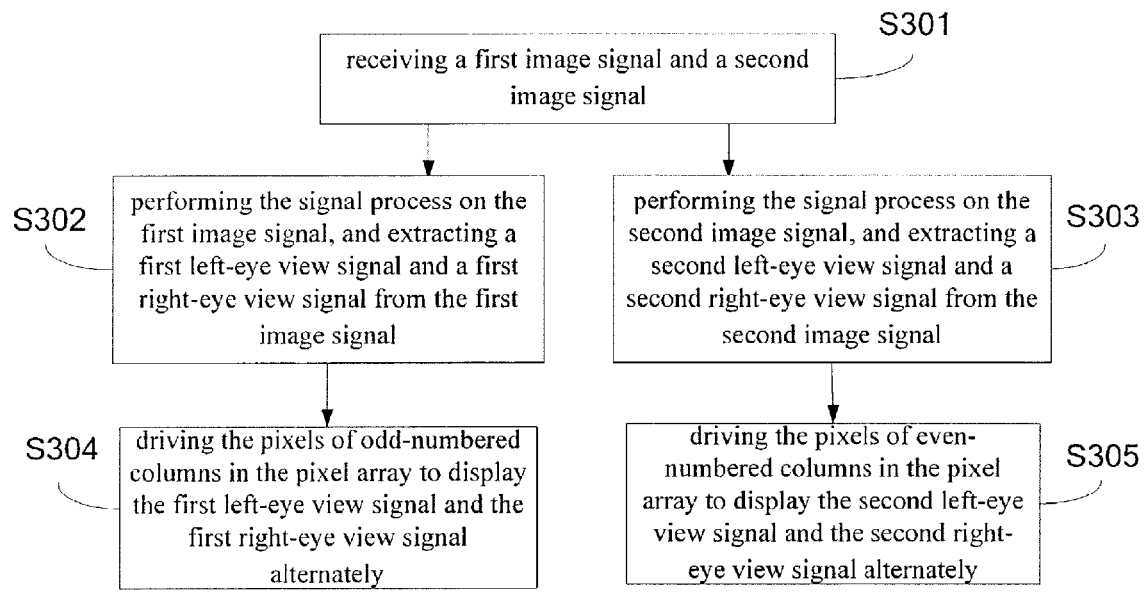
FIG. 3 is a flowchart of steps of another display driving method provided by an embodiment of the present disclosure.

One embodiment of the present disclosure provides a display driving method for driving a display device to display, and the display device includes a pixel array formed by pixels of M rows and N columns. As shown in FIG. 3, the method includes following steps:

at the step S301, receiving a first image signal and a second image signal which correspond to different users respectively and are different from each other, and, both the first image signal and the second image signal are received as 3D image signals;

at the step S302, performing a signal process on the first image signal, and extracting a first left-eye view signal and a first right-eye view signal from the first image signal;

at the step S303, performing a signal process on the second image signal, and extracting a second left-eye view signal and a second right-eye view signal from the second image signal;

at the step S304, driving the pixels of odd-numbered columns in the pixel array to display the first left-eye view signal and the first right-eye view signal alternately; and at the step S305, driving the pixels of even-numbered columns in the pixel array to display the second left-eye view signal and the second right-eye view signal alternately.

In an example, an alternating frequency at which the first left-eye view signal and the first right-eye view signal are alternately displayed is greater than or equal to 120 HZ, and an alternating frequency at which the second left-eye view signal and the second right-eye view signal are alternately displayed is greater than or equal to 120 HZ. The alternating frequency being greater than or equal to 120 HZ is able to make human eyes perceive no flickers.

The above steps S302 and S303 only represents different steps and there is no temporal order existed between the step S302 and step S303, that is, it is possible to firstly execute the step S302 and then the step S303, it is also possible to firstly execute the step S303 and then the step S302, and it is still possible to execute the steps S302 and S303 simultaneously. Furthermore, the step S304 is executed after the step 302, and the step S305 is executed after the step S303, but there is no limitation on the temporal order between the step S304 and step S305.

The display driving method provided by the embodiment of the present disclosure firstly receives the first image signal and the second image signal, then processes the first image signal and the second image signal respectively and extracts the left-eye view signals and right-eye view signals from the first image signal and the second image signal respectively, and finally drives the pixels of odd-numbered columns in the pixel array to display the first left-eye view signal and the first right-eye view signal alternately and drives the pixels of even-numbered columns in the pixel array to display the second left-eye view signal and the second right-eye view signal alternately, and the emergent light of the pixels of odd-numbered columns is the first polarized light, the emergent light of the pixels of even-numbered columns is the second polarized light, and the polarization direction of the first polarized light is different from that of the second polarized light. Thereby, the different users may select different polarized lenses to watch different image signals according to their own requirements, and a separation of the left-eye signals and right-eye signals can be realized by matching a timing of lenses with a timing of the implemented apparatus, which makes users watch the 3D image signals. Thus, the embodiment of the present disclosure realizes that different 3D video signals are displayed simultaneously to different users through one display device.

Figure 4:
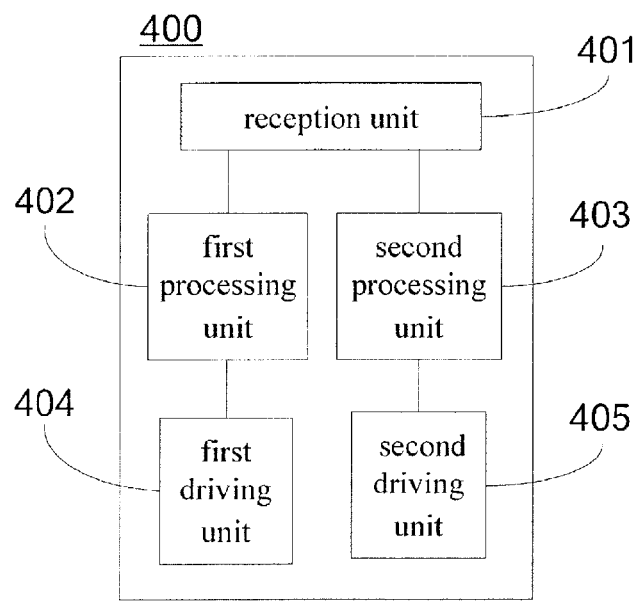
FIG. 4 is a schematic diagram of a structure of a display driving apparatus provided by an embodiment of the present disclosure.

One embodiment of the present disclosure provides a display driving apparatus for driving a display device to display, the display device includes a pixel array formed by pixels of M rows and N columns. The display driving apparatus may perform the display driving method provided by any one of the above embodiments. Specifically, as shown in FIG. 4, the display driving apparatus 400 includes following units:

a reception unit 401 operable to receive a first image signal and a second image signal which correspond to different users respectively;

a first processing unit 402 operable to perform the signal process on the first image signal to acquire the processed first image signal;

a second processing unit 403 operable to perform the signal process on the second image signal to acquire the processed second image signal;

a first driving unit 404 operable to drive the pixels of odd-numbered columns in the pixel array to display the processed first image signal; and a second driving unit 405 operable to drive the pixels of even-numbered columns in the pixel array to display the processed second image signal, wherein the emergent light of the pixels of odd-numbered columns is the first polarized light, the emergent light of the pixels of even-numbered columns is the second polarized light, and the polarization direction of the first polarized light is different from that of the second polarized light.

In the display driving apparatus provided by the embodiment of the present disclosure, the reception unit firstly receives the first image signal and the second image signal, the first processing unit and the second processing unit then process the first image signal and the second image signal respectively, and the first driving unit and the second driving unit finally drive the pixels of odd-numbered columns in the pixel array to display the processed first image signal and drive the pixels of even-numbered columns in the pixel array to display the processed second image signal, and the emergent light of the pixels of odd-numbered columns is the first polarized light, the emergent light of the pixels of even-numbered columns is the second polarized light, and the polarization direction of the first polarized light is different from that of the second polarized light. Thereby, the different users may select different polarized lenses to watch different image signals according to their own requirements. Thus, the embodiment of the present disclosure realizes that different video signals are displayed simultaneously to different users through one display device.

Alternatively, the first image signal is the 2D image signal or the 3D image signal, and the second image signal is the 2D image signal or the 3D image signal.

Alternatively, when the first image signal is the 3D image signal, the first processing unit 402 is further operable to extract the first left-eye view signal and the first right-eye view signal from the first image signal, and the first driving unit 404 is further operable to drive the pixels of odd-numbered columns in the pixel array to display the first left-eye view signal and the first right-eye view signal alternately.

Alternatively, when the second image signal is the 3D image signal, the second processing unit 403 is further operable to extract the second left-eye view signal and the second right-eye view signal from the second image signal, and the second driving unit 405 is further operable to drive the pixels of even-numbered columns in the pixel array to display the second left-eye view signal and the second right-eye view signal alternately.

Alternatively, the alternating frequency at which the first driving unit 404 alternately displays the first left-eye view signal and the first right-eye view signal is greater than or equal to 120 HZ, and the alternating frequency at which the second driving unit 405 alternately displays the second left-eye view signal and the second right-eye view signal is greater than or equal to 120 HZ.

A further embodiment of the present disclosure provides a display system including a display device and glasses.

The display device includes the display driving apparatus provided by any one of the above embodiments. In addition, the display device may be any product or means having a function of displaying, such as electronic paper, a mobile phone, a tablet computer, a TV set, a display, a notebook computer, a digital photo frame, a navigator, etc. The display device is not limited thereto, as long as it includes the display driving apparatus of the above embodiments.

The glasses include odd-type glasses, even-type glasses, 3D odd-type glasses and 3D even-type glasses. The odd-type glasses may transmit the first polarized light; the even-type glasses may transmit the second polarized light; the 3D odd-type glasses includes a first left-eye lens and a first right-eye lens, the first left-eye lens and the first right-eye lens are both able to transmit the first polarized light, the first left-eye lens is in a transmission state when the pixels of odd-numbered columns of the display device display the first left-eye view signal, and the first right-eye lens is in the transmission state when the pixels of odd-numbered columns of the display device display the first right-eye view signal; and the 3D even-type glasses includes a second left-eye lens and a second right-eye lens, the second left-eye lens and the second right-eye lens are both able to transmit the second polarized light, the second left-eye lens is in the transmission state when the pixels of even-numbered columns of the display device display the second left-eye view signal, and the second right-eye lens is in the transmission state when the pixels of even-numbered columns of the display device display the second right-eye view signal.

In an example, the 3D odd-type glasses include a first polarizing plate which can transmit the first polarized light, the 3D even-type glasses include a second polarizing plate which can transmit the second polarized light, and both the 3D odd-type glasses and the 3D even-type glasses further include a pair of shutter-type 3D glasses. Both left lens and right lens of the shutter-type 3D glasses contain one liquid crystal layer, which can change into a non-projective state in a case of being applied to a certain voltage, and be similar with ordinary lenses in the absence of additional voltage. Since the display device displays the left-eye image signal and the right-eye image signal of the 3D image signal alternately and the alternating frequency of the display device is synchronized with that of the shutter-type 3D glasses, a left-eye view is correspondingly transmitted through the left lens when the display device displays the left-eye view, and a right-eye view is correspondingly transmitted through the right lens when the display device displays the right-eye view. Thereby, a viewer sees different picture switched at a high speed, in his/her two eyes, which would create an illusion in his/her brain, and thus may see a stereo image. A separation of the first image signal, the second image signal and image signals received by the left and right eyes can be realized by matching the polarizing plates with the shutter-type 3D glasses.

The described above are only specific embodiments of the present disclosure, but the protection scope of the present disclosure is not limited thereto. Any change or substitution which may be easily thought of by those skilled in the art within the technical scope disclosed by the present disclosure should all be contained in the protection scope of the present disclosure. Thus, the protection scope of the present disclosure should be subject to the protection scope of claims.

What is claimed is:

1. A display driving method for driving a display device to display, the display device comprising a pixel array formed by pixels of M rows and N columns, the method comprising:

receiving a first image signal and a second image signal which correspond to different users respectively;

performing a signal process on the first image signal to acquire a processed first image signal, and performing a signal process on the second image signal to acquire a processed second image signal;

driving the pixels of odd-numbered columns in the pixel array to display the processed first image signal and driving the pixels of even-numbered columns in the pixel array to display the processed second image signal, wherein emergent light of the pixels of odd-numbered columns is a first polarized light, emergent light of the pixels of even-numbered columns is a second polarized light, and a polarization direction of the first polarized light is different from that of the second polarized light.

2. The method according to claim 1, wherein the first image signal is a 2D image signal or a 3D image signal, and the second image signal is a 2D image signal or a 3D image signal.

3. The method according to claim 2, wherein when the first image signal is the 3D image signal, said performing the signal process on the first image signal to acquire the processed first image signal comprises:
    extracting a first left-eye view signal and a first right-eye view signal from the first image signal, and
    said driving the pixels of odd-numbered columns in the pixel array to display the processed first image signal comprises:
    driving the pixels of odd-numbered columns in the pixel array to display the first left-eye view signal and the first right-eye view signal alternately.

4. The method according to claim 2, wherein when the second image signal is the 3D image signal, said performing the signal process on the second image signal to acquire the processed second image signal comprises:
    extracting a second left-eye view signal and a second right-eye view signal from the second image signal, and
    said driving the pixels of even-numbered columns in the pixel array to display the processed second image signal comprises:
    driving the pixels of even-numbered columns in the pixel array to display the second left-eye view signal and the second right-eye view signal alternately.

5. The method according to claim 3, wherein an alternating frequency at which the first left-eye view signal and the first right-eye view signal are alternately displayed is greater than or equal to 120 HZ.

6. A display driving apparatus for driving a display device to display, the display device comprising a pixel array formed by pixels of M rows and N columns, the apparatus comprises:
    a receiver operable to receive a first image signal and a second image signal which correspond to different users respectively;
    a first processor operable to perform a signal process on the first image signal to acquire a processed first image signal;
    a second processor operable to perform a signal process on the second image signal to acquire a processed second image signal;
    a first driver operable to drive the pixels of odd-numbered columns in the pixel array to display the processed first image signal; and
    a second driver operable to drive the pixels of even-numbered columns in the pixel array to display the processed second image signal,
    wherein emergent light of the pixels of odd-numbered columns is a first polarized light, emergent light of the pixels of even-numbered columns is a second polarized light, and a polarization direction of the first polarized light is different from that of the second polarized light.

7. The apparatus according to claim 6, wherein the first image signal is a 2D image signal or a 3D image signal, and the second image signal is a 2D image signal or a 3D image signal.

8. The apparatus according to claim 7, wherein when the first image signal is the 3D image signal,
    said first processor is further operable to extract a first left-eye view signal and a first right-eye view signal from the first image signal; and
    said first driver is further operable to drive the pixels of odd-numbered columns in the pixel array to display the first left-eye view signal and the first right-eye view signal alternately.

9. The apparatus according to claim 7, wherein when the second image signal is the 3D image signal,
    said second processor is further operable to extract a second left-eye view signal and a second right-eye view signal from the second image signal; and
    said second driver is further operable to drive the pixels of even-numbered columns in the pixel array to display the second left-eye view signal and the second right-eye view signal alternately.

10. The apparatus according to claim 8, wherein an alternating frequency at which the first driver alternately displays the first left-eye view signal and the first right-eye view signal is greater than or equal to 120 HZ.

11. A display system comprising a display device and glasses, wherein
    the display device comprises a display driving apparatus, and
    the glasses comprises odd-type glasses, even-type glasses, 3D odd-type glasses and 3D even-type glasses, wherein the odd-type glasses may transmit a first polarized light; the even-type glasses may transmit a second polarized light; the 3D odd-type glasses comprises a first left-eye lens and a first right-eye lens, the first left-eye lens and the first right-eye lens are both able to transmit the first polarized light, the first left-eye lens is in a transmission state when pixels of odd-numbered columns of the display device display a first left-eye view signal, and the first right-eye lens is in the transmission state when pixels of odd-numbered columns of the display device display a first right-eye view signal; and the 3D even-type glasses comprises a second left-eye lens and a second right-eye lens, the second left-eye lens and the second right-eye lens are both able to transmit the second polarized light, the second left-eye lens is in the transmission state when the pixels of even-numbered columns of the display device display a second left-eye view signal, and the second right-eye lens is in the transmission state when the pixels of even-numbered columns of the display device display a second right-eye view signal,
    wherein the display driving apparatus is operable to drive the display device to display, the display device comprising a pixel array formed by the pixels of M rows and N columns, the apparatus comprises:
    a receiver operable to receive a first image signal and a second image signal which correspond to different users respectively;
    a first processor operable to perform a signal process on the first image signal to acquire a processed first image signal;
    a second processor operable to perform a signal process on the second image signal to acquire a processed second image signal;

a first driver operable to drive the pixels of odd-numbered columns in the pixel array to display the processed first image signal; and a second driver operable to drive the pixels of even-numbered columns in the pixel array to display the processed second image signal, wherein emergent light of the pixels of odd-numbered columns is the first polarized light, emergent light of the pixels of even-numbered columns is the second polarized light, and a polarization direction of the first polarized light is different from that of the second polarized light.

12. The display system according to claim 11, wherein the first image signal is a 2D image signal or a 3D image signal, and the second image signal is a 2D image signal or a 3D image signal.

13. The display system according to claim 12, wherein when the first image signal is the 3D image signal, said first processor is further operable to extract the first left-eye view signal and the first right-eye view signal from the first image signal; and said first driver is further operable to drive the pixels of odd-numbered columns in the pixel array to display the first left-eye view signal and the first right-eye view signal alternately.

14. The display system according to claim 12, wherein when the second image signal is the 3D image signal, said second processor is further operable to extract the second left-eye view signal and the second right-eye view signal from the second image signal; and said second driver is further operable to drive the pixels of even-numbered columns in the pixel array to display the second left-eye view signal and the second right-eye view signal alternately.

15. The display system according to claim 13, wherein an alternating frequency at which the first driver alternately displays the first left-eye view signal and the first right-eye view signal is greater than or equal to 120 HZ.

16. The display system according to claim 14, wherein an alternating frequency at which the second driver alternately displays the second left-eye view signal and the second right-eye view signal is greater than or equal to 120 HZ.

17. The method according to claim 4, wherein an alternating frequency at which the second left-eye view signal and the second right-eye view signal are alternately displayed is greater than or equal to 120 HZ.

18. The apparatus according to claim 9, wherein an alternating frequency at which the second driver alternately displays the second left-eye view signal and the second right-eye view signal is greater than or equal to 120 HZ.

* * * * *